United States Patent [19]

Kawabata

[11] Patent Number: 4,582,424
[45] Date of Patent: Apr. 15, 1986

[54] DISTANCE MEASURING APPARATUS
[75] Inventor: Takashi Kawabata, Kamakura, Japan
[73] Assignee: Canon Kabushiki Kaisha, Tokyo, Japan
[21] Appl. No.: 493,975
[22] Filed: May 12, 1983
[30] Foreign Application Priority Data
May 20, 1982 [JP] Japan .................................. 57-83971
[51] Int. Cl.$^4$ .......................... G01C 3/00; G01C 5/00; G03B 3/00
[52] U.S. Cl. ........................................ 356/1; 354/403
[58] Field of Search ............................ 356/1; 354/403
[56] References Cited
U.S. PATENT DOCUMENTS

| | | | |
|---|---|---|---|
| 3,435,744 | 4/1969 | Stimson | 95/44 |
| 3,443,502 | 5/1969 | Harvey | 356/1 |
| 3,781,111 | 12/1973 | Fletcher et al. | 356/152 |
| 4,251,144 | 2/1981 | Matsuda et al. | |
| 4,367,934 | 1/1983 | Matsui | 354/403 |
| 4,371,261 | 2/1983 | Tsji | 356/1 |

Primary Examiner—S. C. Buczinski
Assistant Examiner—Melissa Q. Koltak
Attorney, Agent, or Firm—Fitzpatrick, Cella, Harper & Scinto

[57] ABSTRACT

A distance measuring apparatus provided with a plurality of light-emitting units and a plurality of light-receiving units. The light emission period of each of the light-emitting units is changed over at each predetermined period interval. A plurality of light-receiving elements constituting each light-receiving unit are constructed so as to receive the reflected light from a plurality of distance measurement fields of view on an object to be photographed in a plurality of distance measurement zones obtained by dividing a range to be measured into several blocks. The input signal from each of the light-receiving elements in each of the distance measurement zones is changed over in synchronism with the light emission period of the light-emitting units and the output signals for the respective distance measurement zones are compared, whereby a distance data indicative of the distance measurement zone most approximate to the object distance is put out.

1 Claim, 3 Drawing Figures

4,582,424

DISTANCE MEASURING APPARATUS

BACKGROUND OF THE INVENTION

1. Field of the Invention

This invention relates to a distance measuring apparatus for detecting the distance data of an object to be photographed, and in particular to a so-called active type distance measuring apparatus which emits an object distance detecting light from the photographing apparatus side toward the object to be photographed. More particularly, the present invention relates to a distance measuring apparatus using a plurality of light-emitting means and a plurality of light-receiving means.

2. Description of the Prior Art

A number of so-called active type distance measuring apparatus which apply a distance detecting light from the photographing apparatus side toward an object to be photographed have been proposed in U.S. Pat. No. 3,435,744 and others. These active type distance measuring apparatuses of the prior art are often designed such that a small spot light obtained by stopping down a light beam is projected to keep the accuracy with which the reflected light from the object to be photographed is received. Where such a spot light is used, if a plurality of objects to be photographed exist in the field of view, the spot light is applied to the position intermediate the objects with a result that the distance of a distant object in the background is detected and the picture-taking lens cannot be moved and controlled to a proper focusing position.

Further, in the apparatuses of the prior art, correct distance measurement has sometimes not been accomplished depending on the contrast or the like of the brightness of the surface of the object to be photographed.

SUMMARY OF THE INVENTION

It is a first object of the present invention to provide an apparatus which has a plurality of light-emitting means and a plurality of light-receiving means and in which the range of distance to be measured from the close distance to the infinity position is divided into a plurality of distance measurement zones, whereby distance data indicative of the distance measurement zone corresponding to the object distance is detected.

It is a second object of the present invention to provide a distance measuring apparatus in which the light emission timing of the plurality of light-emitting means is time-divided and the light-receiving means are disposed so as to receive the reflected lights from a plurality of distance measurement fields of view on an object to be photographed in each of said distance measurement zones and further, a signal detecting circuit for successively changing over and controlling the output signals from the light receiving elements for the respective distance measurement zones in accordance with the timing of the time division of the light-emitting means is provided, whereby the distance data of the distance measurement zone most approximate to the object distance can be put out by said circuit.

It is a third object of the present invention to provide a circuit which enables an electric circuit achieving the second object to be efficiently constructed.

The invention will become fully apparent from the following detailed description thereof taken in conjunction with the accompanying drawings.

DESCRIPTION OF THE PREFERRED EMBODIMENT

An embodiment of the present invention will hereinafter be described with reference to FIGS. 1, 2 and 3.

Figure 1:
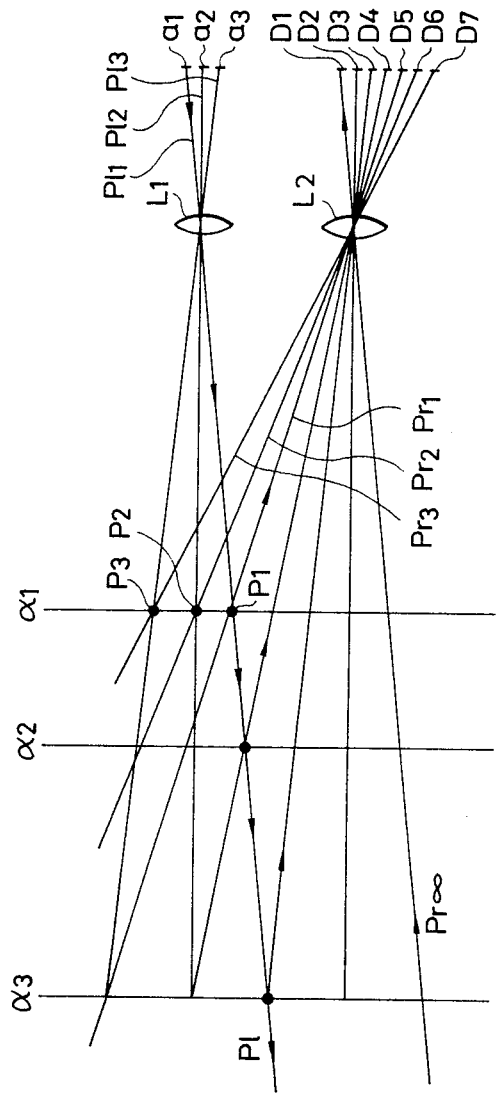
FIG. 1 illustrates the arrangement relation of a plurality of light-receiving elements for receiving the pulse lights from a plurality of light-emitting means $a_1$, $a_2$ and $a_3$.

FIG. 1 illustrates the light-emitting means according to the present invention and the relation between the light emission of the light emitting means and the light reception. In FIG. 1, reference characters $a_1$, $a_2$ and $a_3$ designate light-emitters such as light-emitting elements which emit pulse lights of a predetermined period on the basis of the signal of a light emission control circuit shown in block A in FIG. 2. $Pl_1$, $Pl_2$ and $Pl_3$ denote the light beams from the light-emitting elements $a_1$, $a_2$ and $a_3$, respectively, and $L_1$ designates a projecting lens disposed in front of the light-emitting elements $a_1$, $a_2$, $a_3$. $\alpha_1$, $\alpha_2$ and $\alpha_3$ designate objects to be photographed lying on the photographing optical path. $Pr_1$, $Pr_2$, ... denote the reflected light beams of the lights emitted from the light-emitting elements, reflected from the objects to be photographed. $D_1$, $D_2$, ..., $D_7$ designate light-receiving elements such as light sensors having the photoelectric converting function. The light-receiving elements $D_1$, $D_2$, ..., $D_7$ are rectilinearly arranged rearwardly of a light-receiving lens $L_2$ and receive the reflected lights from the light-emitting elements.

The light-emitting elements $a_1$–$a_3$, the lenses $L_1$, $L_2$ and the light-receiving elements $D_1$–$D_7$ are arranged, for example, in the following manner.

In the case of the object $\alpha_1$ near the lenses $L_1$ and $L_2$, the light-receiving elements are disposed so that the reflected light $Pr_1$ by the pulse light $Pl_1$ of the first light-emitter $a_1$ is received chiefly by the fifth light-receiving elements $D_5$, the reflected light by the second light-emitter $a_2$ is received chiefly by the sixth light-receiving element $D_6$ and the reflected light by the third light-emitter $a_3$ is received chiefly by the seventh light-receiving element $D_7$.

In the case of the object $\alpha_2$ slightly distant from the lenses $L_1$ and $L_2$, the light-receiving elements are disposed so that the reflected light $Pr_2$ by the first light-emitter $a_1$ is received chiefly by the fourth light-receiving element $D_4$, the reflected light by the second light-emitter $a_2$ is received chiefly by the fifth light-receiving element $D_5$ and the reflected light by the third light-emitter $a_3$ is received chiefly by the sixth light-receiving element $D_6$.

In the case of the object $\alpha_3$ more distant from the lenses $L_1$ and $L_2$, the light-receiving elements are disposed so that the reflected light $Pr_3$ by the first light-emitter $a_1$ is received chiefly by the third light-receiving element $D_3$, the reflected light by the second light-emitter $a_2$ is received chiefly by the fourth light-receiving element $D_4$ and the reflected light by the third light-emitter $a_3$ is received chiefly by the fifth light-receiving element $D_5$.

In the case of the object $\alpha_\infty$ at infinity, the light-receiving elements are disposed so that the reflected light Pr∞ by the first light-emitter $a_1$ is received chiefly by the first light-receiving element $D_1$, the reflected light by the second light-emitter $a_2$ is received chiefly by the second light-receiving element $D_2$ and the reflected light by the third light-emitter $a_3$ is received chiefly by the third lightreceiving element $D_3$.

Although not shown, in the case of the object $\alpha_4$ nearer than the object $\alpha_\infty$ at infinity and more distant than the distant object $\alpha_3$, the light-receiving elements are disposed so that the reflected light by the first light-emitter $a_1$ is received chiefly by the second light-receiving element $D_2$, the reflected light by the second light-emitter $a_2$ is received chiefly by the third light-receiving element $D_3$ and the reflected light by the third light-emitter $a_3$ is received chiefly by the fourth light-receiving element $D_4$.

Accordingly, in the embodiment of FIG. 1, the distance zone of the objects $\alpha_1$–$\alpha_\infty$ is discriminated by being divided into five stages.

Figure 2:
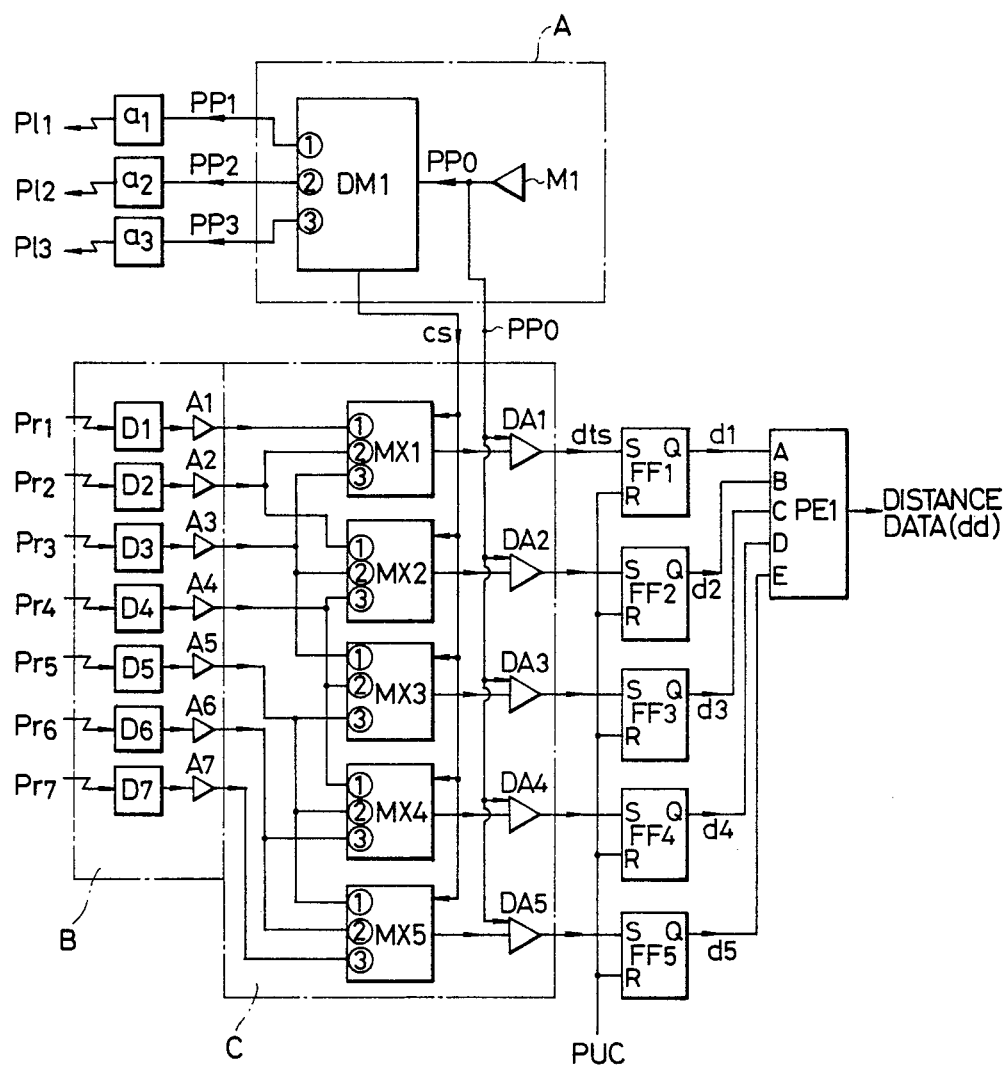
FIG. 2 diagramatically shows the circuit of the present invention.

FIG. 2 shows the construction of a light emission control circuit A for controlling the light emission of the light-emitting elements $a_1$–$a_3$ of the light-emitting means described in connection with FIG. 1 and a detecting circuit receiving the output signals of the light-receiving elements as input and detecting a distance measurement zone corresponding to the object distance.

Figure 3:
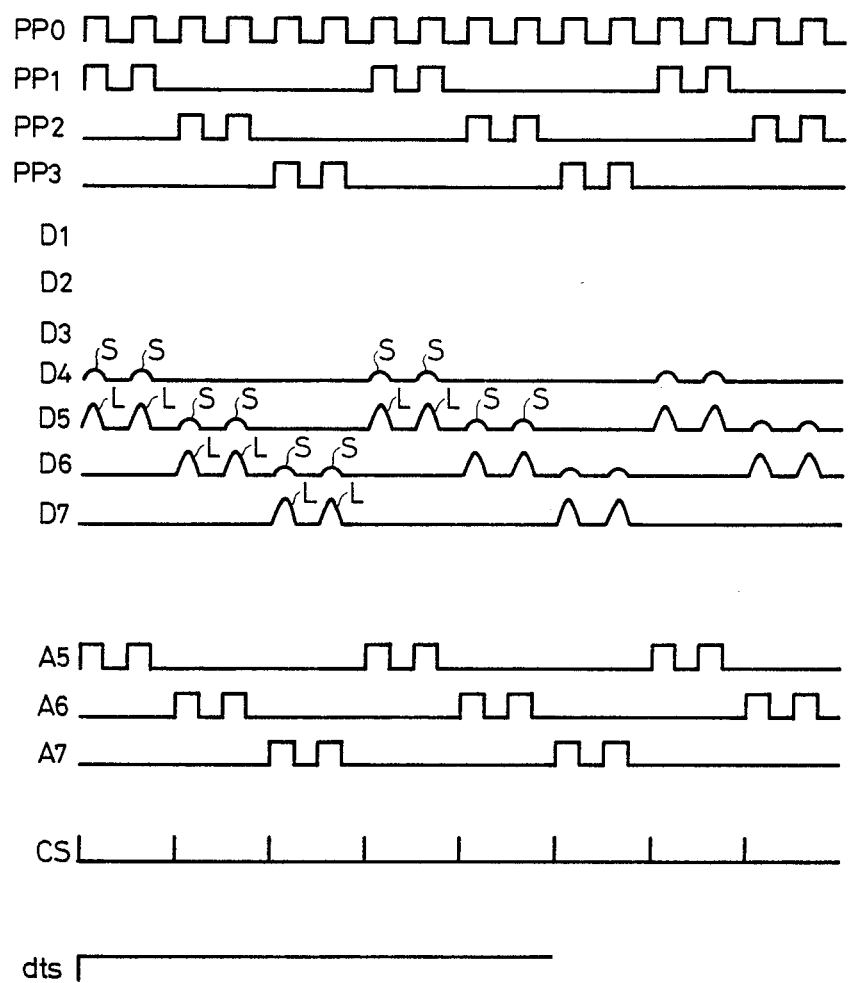
FIG. 3 shows the major output waveforms of various components in the circuit diagram of FIG. 2.

FIG. 3 shows the output waveforms of the components of the circuits of FIG. 2.

The light emission control circuit A is a drive circuit which puts out a pulse wave such as an output waveform $PP_0$ shown in FIG. 3. $DM_1$ designates a demultiplexer circuit which receives the pulse wave $PP_0$ as input and puts out the light emission pulses $PP_1$, $PP_2$ and $PP_3$ of the light-emitting elements $a_1$, $a_2$ and $a_3$, respectively, from the output terminals ①, ② and ③ thereof. $Pl_1$, $Pl_2$ and $Pl_3$ denote the light beam pulses from the respective light-emitting elements.

In FIG. 2, a block B is a light-receiving means. The light-receiving means B comprises light-receiving elements $D_1$–$D_7$ and amplifiers for amplifying the output signals of the light-receiving elements $D_1$–$D_7$. A block C designates a signal detecting circuit which comprises five multiplexers $MX_1$–$MX_5$ for dividing the distance measurement range into five distance measurement zones and receiving as input the output signals of the light-receiving elements receiving the reflected lights from the three distance measurement fields of view of the objects on the distance measurement zones, and detector means $DA_1$–$DA_5$ each comprising a synchronous detector and a comparator given a desired threshold. $FF_1$–$FF_5$ designate memory flip-flop circuits. $PE_1$ denotes an encoder having the priority function of receiving the signals of the flip-flops as input and putting out a distance data dd corresponding to a signal obtained by dividing into five stages the close distance to the telephoto distance in the range to be measured.

Operation of the circuit of FIG. 2 will now be described by assuming a case where the object whose distance is to be measured lies at the position $\alpha_1$ indicated in FIG. 1. The pulse lights $Pl_1$–$Pl_3$ from the light-emitting elements $a_1$–$a_3$ are applied to and reflected by three distance measurement fields of view on the objects lying in the distance measurement zones $\alpha_1$–$\alpha_\infty$ and are received by the elements $D_1$–$D_7$ of the light-receiving element group B. The emitted lights $Pl_1$–$Pl_3$ to the position $\alpha_1$ are reflected from the three distance measurement fields of view $P_1$, $P_2$ and $P_3$ on the position $\alpha_1$ and are received by the fifth light-receiving element $D_5$, the sixth light-receiving element $D_6$ and the seventh light-receiving element $D_7$, respectively, and the outputs of these light-receiving elements $D_5$, $D_6$ and $D_7$ are amplified by amplifiers $A_5$, $A_6$ and $A_7$, respectively.

The reflected light $Pr_1$ from the distance measurement field of view $P_1$ enters the light-receiving element $D_5$, and large output waveforms L, L, . . . are put out from this light-receiving element in synchronism with the period of light emission pulse $PP_1$ as is shown at $D_5$ in FIG. 3. The reflected light $Pr_2$ from the distance measurement field of view $P_2$ enters the light-receiving element $D_6$, and large waveforms L, L, . . . are put out from this element in synchronism with the period of light emission pulse $PP_2$ as is shown at $D_6$ in FIG. 3. Further, the reflected light $Pr_3$ from the distance measurement field of view $P_3$ enters the light-receiving element $D_7$, and waveforms L, L, . . . are put out from this element in synchronism with pulse $PP_3$ as is shown at $D_7$ in FIG. 3. The reflected light from each distance measurement field of view of the object lying at the position on $\alpha_2$ enters the light-receiving elements $D_4$, $D_5$ and $D_6$ as previously described, but since the distance object is assumed to lie on $\alpha_2$, small output waveforms S appear in the light-receiving elements $D_4$, $D_5$ and $D_6$ in synchronism with light emission pulses $PP_1$–$PP_3$, respectively, as is shown at $D_4$, $D_5$ and $D_6$ in FIG. 3. If the output waveforms of the light-receiving elements which have received the reflected light from each distance measurement zone are shaped and only the effective output waveforms are shown as the signals from the position on $\alpha_1$, they will be as shown at $A_5$, $A_6$ and $A_7$ in FIG. 3.

The output from the other amplifiers $A_1$–$A_4$ are weak signals which do not reach a predetermined level value.

The five multiplexers $MX_1$–$MX_5$ of the signal detecting circuit receive as inputs for each three distance measurement fields of view the signals from the light-receiving means which has received the reflected lights from each three distance measurement fields of view on five distance measurement zones. The input state when the output signals from the amplifiers $A_1$–$A_7$ are applied as input to the multiplexers $MX_1$–$MX_5$ is designed so as to be changed over into ①→②→③ in synchronism with a change-over signal CS which changes over the light emission pulse $PP_0$ of the demultiplexer $DM_1$ into light emission pulses $PP_1$, $PP_2$ and $PP_3$ of the respective light-emitting elements. The detecting circuit group $DA_1$–$DA_5$ receives as input the signals from the multiplexers $MX_1$–$MX_5$ in synchronism with the reference pulse $PP_0$, compares the output signals from the multiplexers with a predetermined reference level signal and puts out a logic signal 1 when the input value is greater than the reference level signal, and puts out a logic signal 0 when the input value is lower than the reference level signal.

In the case of the present embodiment, the input of the detecting circuit $DA_5$ which has received as input the signal of the multiplexer $MX_5$ which in turn has received the signals from the light-receiving element means $D_5$–$D_7$ and $A_5$–$A_7$ which have received the reflected light from the distance measurement zone in which the object to be photographed exists is higher than the input levels of the other detecting circuits $DA_1$–$DA_4$ and also greater than the reference level signal with which it is compared and therefore, a signal exhibiting a high output as a logic signal is put out from the detecting circuit $DA_5$ and no output signal is put out from the other detecting circuits $DA_1$-$DA_4$.

$FF_1$-$FF_5$ are memory flip-flops connected to the rear stages of the detecting circuits $DA_1$-$DA_5$. When a high level detection signal dts is applied as input to the flip-flops $FF_1$-$FF_5$, they are set and put out high level distance signals $d_1$-$d_5$. The flip-flops $FF_1$-$FF_5$ are reset by a reset signal puc put out from means, not shown.

$PE_1$ designates an encoder having the priority function. It is connected to the rear stage of the group of flip-flops $FF_1$-$FF_5$ and receives as input any one of distance signals $d_1$-$d_5$ corresponding to the zones of five distance stages and puts out a distance data dd corresponding to the distance signal. This distance data may be either digital or analog. For example, the distance signal $d_1$ corresponds to the most distant zone. In other words, in the case of the object $\theta_\infty$ at infinity shown in FIG. 1, the distance signal $d_1$ is applied as input to the encoder $PE_1$ and an infinity distance data dd is put out from the encoder. The distance signal $d_5$ corresponds to the nearest zone and in this case, a distance data dd indicative of the shortest distanee is likewise put out from the encoder $PE_1$.

When the plurality of distance signals $d_1$-$d_5$ are applied as input to the encoder $PE_1$, the priority function of the encoder works and the distance signals $d_1$-$d_5$ indicative of the short distance are selected and a distance data dd corresponding to the distance signal is put out.

Where sensors having an accumulating effect and capable of selectively reading out such as MOS photosensors are utilized as the light-receiving elements $D_1$-$D_7$, the multiplexers $MX_1$-$MX_5$ in the embodiment may be constructed within the sensors and the firststage amplifiers $A_1$-$A_7$ may be omitted.

As described above, the light-receiving elements $D_1$-$D_7$ (including the first-stage amplifiers $A_1$-$A_7$) are used in common to effect a plurality of measurements by a plurality of narrow-width pulse lights Pl and from the result thereof, distance measurement display or automatic focusing may be effected, whereby distance measurement hardly affected by the patterns or conditions of the objects $\theta_1$-$\theta_\infty$ to be photographed becomes possible.

Moreover, there is a merit that the number of the light-receiving elements $D_1$-$D_7$ on the light-receiving circuit side is only slightly increased and the circuit, particularly, the multiplexers $MX_1$-$MX_5$ and subsequent demodulating portions can be used in common and thus, the circuit is not so bulky.

There is also a merit that the adjustment is substantially the same as that in the prior art because of the integration of the plurality of light-emitters $a_1$-$a_3$ and the integration of the light-receiving elements $D_1$-$D_7$.

What is claim is:

1. A distance measuring apparatus comprising:
   (a) a plurality of light-emitting means emitting light at a predetermined period interval, said light-emitting means projecting the light onto a plurality of distance measurement fields of view of an object to be photographed whose distance is to be measured;
   (b) light-receiving means comprising a plurality of light-receiving elements for receiving the reflected light from said object, said light-receiving elements receiving the reflected light from a plurality of distance measurement fields of view on said object in distance measurement zones obtained by dividing a distance measurement range into several blocks;
   (c) a signal detecting circuit having change-over means for receiving as input the output signals of said light-receiving elements having received the reflected light from said distance measurement field of view in each of said distance measurement zones and for time-divisionally changing over the output signal from each of said light-receiving elements in each of said distance measurement zones;
   (d) signal output means for receiving as input the signal of said signal detecting circuit for each of said distance measurement zones and putting out a signal from the distance measurement zone most approximate to the object distance; and
   (e) means for putting out a distance data, said means receiving as input the signal of said output means and putting out the distance data.

* * * * *

UNITED STATES PATENT AND TRADEMARK OFFICE
CERTIFICATE OF CORRECTION

PATENT NO. : 4,582,424
DATED : April 15, 1986
INVENTOR(S) : Takashi Kawabata

It is certified that error appears in the above-identified patent and that said Letters Patent is hereby corrected as shown below:

Column 1, line 57, change "light receiving" to --light-receiving--.

Column 2, line 7, change "diagramatically" to --diagrammatically--;

line 18, change "light emitting" to --light-emitting--; and line 44, change "elements $D_{5'}$," to --element $D_5$,--.

Column 3, line 6, change "lightreceiving" to --light receiving--.

Column 5, line 23, change "distanee" to --distance--; and line 36, change "firststage" to --first-stage--.

UNITED STATES PATENT AND TRADEMARK OFFICE
CERTIFICATE OF CORRECTION

PATENT NO. : 4,582,424

DATED : April 15, 1986

INVENTOR(S) : Takashi Kawabata

It is certified that error appears in the above-identified patent and that said Letters Patent is hereby corrected as shown below:

Column 6, line 13, change "What is claim is:" to --What I claim is--.

Signed and Sealed this

Twenty-third Day of December, 1986

Attest:

DONALD J. QUIGG

Attesting Officer     Commissioner of Patents and Trademarks